March 1, 1966 C. J. KIBLER ET AL 3,238,178
ELASTOMERIC POLYMERS STABILIZED WITH TRIALKYLATED PHENOL
AND THIOORGANIC ESTERS
Filed Jan. 15, 1962

PREPOLYMERIZER

POLYMERIZER

BOTTOM OF
POLYMERIZER
COLUMN

Charles J. Kibler
Alan Bell
James G. Smith
INVENTORS

BY R. Frank Smith
Charles L. Good
ATTORNEYS

United States Patent Office 3,238,178
Patented Mar. 1, 1966

3,238,178
ELASTOMERIC POLYMERS STABILIZED WITH TRIALKYLATED PHENOL AND THIOORGANIC ESTERS
Charles J. Kibler, Alan Bell, and James G. Smith, Kingsport, Tenn., assignors to Eastman Kodak Company, Rochester, N.Y., a corporation of New Jersey
Filed Jan. 15, 1962, Ser. No. 166,155
10 Claims. (Cl. 260—45.85)

This invention relates to elastomeric polymers and more particularly to highly elastic polyester compositions suitable for the production of various products in which thermal and oxidative stability is necessary. Specifically, the invention relates to novel highly elastic polymeric compositions useful for the production of filaments, films and shaped articles having, not only excellent elastic properties and high strength but in addition high resistance to thermal and oxidative degradation. More specifically, this invention relates to stable elastomeric compositions which possess a high degree of color stability.

In recent years filaments, fibers, films and the like produced from various polyester compositions have become very important in the textile industry. However, in some cases it has been extremely difficult to attain in one and the same material the desired combination of properties such as high melting point, tensile strength and modulus. The problem is rendered even more complex in the case of synthetic polymers which possess elastomeric properties. For, in this instance, it is necessary that a polymer possess, not only the properties mentioned above but in addition the ability to be stretched to at least three times its original length and of returning rapidly to essentially its original dimension. Our copending patent application Serial No. 145,433 filed October 16, 1961 (now abandoned and continued-in-part in Serial No. 215,768 filed August 9, 1962) describes and claims synthetic highly elastic, highly polymeric polyesters which possess the desirable combination of high melting point, high tensile strength, good modulus, high elongation and elastic recovery. In addition our copending patent application Serial No. 151,557, filed November 10, 1961, now U.S. Patent 3,157,519 issued on November 17, 1964 describes a process whereby these elastomeric polyesters can be prepared with high inherent viscosities so as to obtain the optimum properties in objects fabricated from these compositions.

In addition, articles manufactured from elastomeric synthetic polymers are frequently subjected to elevated temperatures in the presence of air. For example, garments manufactured from or containing elastic yarns are normally exposed to elevated temperatures and air both during drying operations in modern automatic driers and also during ironing. Consequently, elastomeric compositions must not suffer adverse effects on exposure to air at elevated temperatures, otherwise their usefulness in many applications, and especially in the textile industry, would be severely restricted. These adverse effects are two kinds. In the first, the polymer degrades, and the physical properties of the shaped articles decrease. The degradation may even progress to the point where the article cannot retain its shape. In the second, degradation of the polymer may or may not occur simultaneously, but the color of the polymer changes markedly. In an unpigmented or undyed polymer, the color usually becomes yellow to yellow-brown. It is highly desirable, then, that elastomeric polymers possess good thermal, oxidative and color stability.

The present invention is an improvement upon or extension of the inventive concept of the polyester compositions described in our prior U.S. Patent 2,901,466 issued August 25, 1959 entitled "Linear Polyester and Polyester Amides From 1,4-Cyclohexanedimethanol." This application is also related to our co-pending application Serial No. 823,298 filed June 29, 1959, now U.S. Patent 3,033,822 issued on May 8, 1962.

The invention has for its principal object to provide a highly elastic polyester composition especially adapted to the manufacture of filaments, fibers, yarns, films and other shaped objects having excellent elastic properties.

Another object is to provide a highly elastic polyester composition from which filaments, fibers and yarns having high tenacity, high elongation, good modulus of elasticity, excellent elastic return, high ironing temperature, excellent hydrolytic stability and excellent thermal and oxidative stability may be produced.

Another object is to provide stable filaments, fibers, and yarns having high tenacity, high elongation, good modulus of elasticity, excellent elastic return, high ironing temperature, excellent hydrolytic stability and excellent color stability.

Another object is to provide stable films and other shaped objects having high tenacity, high elongation, good modulus of elasticity, excellent elastic return, excellent hydrolytic stability and excellent color stability.

Another object is to provide filaments, fibers, yarns, molded articles and other shaped objects which possess excellent color stability and good thermal and oxidative stability in combination with desirable and useful physical properties such as high strength, good elastic modulus, a high degree of elongation and excellent elastic return.

Other objects will appear hereinafter.

These objects are accomplished according to one embodiment of our invention by incorporating into the finished polymer 0.01 to 5% by weight of certain 2,4,6-trialkylated phenols having the general formula:

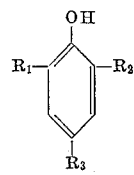

wherein $R_1$, $R_2$, $R_3$ may be all the same or all different and are selected from the group consisting of alkyl groups of 1–20 carbon atoms.

The group of compounds in which the sum of the carbon atoms in groups $R_1$, $R_2$ and $R_3$ equals or exceeds a total of 20 is of particular interest for the purposes of this invention. The preferred group of compounds are those derived from p-cresol, i.e., those in which $R_3$ is methyl, $R_1$ and $R_2$ are straight chain alkyl groups or possess a minimum of chain branching and the sum of the carbon atoms in groups $R_1$ and $R_2$ equals or exceeds 19. Among these preferred compounds 2,6-di-n-dodecyl-p-cresol, 2,6-di-n-octadecyl-p-cresol, 2,6-di(1-methylheptadecyl)-p-cresol and 2-methyl-6-octadecyl-p-cresol confer outstanding thermal and oxidative stability upon the polyester compositions.

Referring now to the process, the polyesters of the invention are prepared in general accordance with the process set forth in our U.S. Patent 2,901,466. However, as indicated in our co-pending application, Serial No. 145,433, filed October 16, 1961, the elastomeric polyesters herein referred to include, in addition to the basic glycol (cis- or trans-cyclohexanedimethanol) and a hexacarbocyclic dicarboxylic acid such as terephthalic acid, a proportion of poly(tetramethylene glycol). In accordance with the instant invention, to these reactants or to the polymer produced from these reactants are added certain trialkylated phenols. While these phenols are employed in small amounts they have nevertheless been found to be extremely effective in providing thermally and oxidatively stable elastomeric articles.

The process described in our copending application, Serial No. 151,557 filed November 10, 1961 can also be used in conjunction with the instant invention to prepare elastomeric polyesters of high viscosity and high stability. The high viscosity is induced by the use of certain secondary and tertiary aromatic amines during the preparation of the polyesters, and the thermal and oxidative stability is induced by the presence in the final polymer of the trialkylated phenolic compounds described hereinabove. It is also within the scope of our invention to utilize the alternate process of our copending application U.S. Serial No. 186,196, filed April 9, 1962. In this process a high viscosity, highly elastic polyester is produced in the presence of thiodipropionic acid, an ester of thiodipropionic acid or a polyester of thiodipropionic acid and a diol. A high viscosity is induced in the final elastomeric polyester by the use of these thiodipropionic acid derivatives during the polyester's preparation and the presence of the trialkylated phenolic compounds in the final polyester results in a polyester possessing good thermal and oxidative stability.

As indicated above, the present invention involves preparation of a highly polymeric polyester employing the basic principles and procedures set forth in our above-mentioned U.S. Patent 2,901,466. More explicitly, our process is carried out as follows: a highly elastic, highly polymeric polyester is prepared by reacting in the presence of an alcoholysis catalyst (A) at least one compound selected from the class consisting of the dibasic carboxylic acids and their esters and (B) at least one member of the group consisting of the cis- and trans-isomers of 1,4-cyclohexanedimethanol and (C) the ether-glycol having the structural formula:

$$HO(CH_2CH_2CH_2CH_2O)_nH$$

wherein $n$ is an integer from 14 to 70 (commonly referred to as poly(tetramethylene glycol)).

The reaction is carried out in such manner that the dihydroxy moiety [cyclohexanedimethanol plus the poly(tetramethylene glycol)] contains at least 50 mole percent of (B). The polyether (C) consequently will constitute less than 50 mole percent of the dihydroxy moiety. To obtain the desired polymer properties the polyether component should be present in an amount corresponding to 50–80 weight percent of the final polyester. Polyesters of this invention have a crystalline melting point greater than 150° C., and an inherent viscosity of at least 1.0 and preferably within the range of 1.3 to 2.5.

The ether-glycol referred to above may be considered as a mixture of low and high molecular weight compounds. It is preferred, however, that the glycol be a mixture of polymers which will have a relatively narrow range of molecular weight. Thus the $n$ of the formula represents the average number of tetramethylene oxide units present. For the production of polyester products of optimum elastomeric properties according to our invention such, for example, as filaments and fibers, we have found that $n$ preferably has an average value of 30 to 44 which represents number average molecular weights in the range of 2200 to 3200.

The dicarboxylic acids which are useful for the preparation of the subject elastomeric polyesters are those in which the carboxylic acid groups are attached to a hexacarbocyclic nucleus in para relationship and the entire hydrocarbon moiety contains 6 to 20 carbon atoms. Examples of hexacarbocyclic dicarboxylic acids wherein the carboxy radicals are attached to a hexacarbocyclic nucleus in para relationship include terephthalic acid, trans-1,4-cyclohexanedicarboxylic acid, 4,4'-sulfonyldibenzoic acid, 4,4'-diphenic acid, 4,4'benzophenonedicarboxylic acid, 1,2-di(p-carboxyphenyl)ethane, 4,4'-methylenedibenzoic acid, 1,2-di(p-carboxyphenoxy)ethane, 4,4'-dicarboxydiphenyl ether, etc. All of these acids contain at least one hexacarbocyclic nucleus. Fused rings can also be present such as in 1,4 or 1,5 or 2,6 or 2,7-napthalenedicarboxylic acid. The hexacarbocyclic dicarboxylic acids are preferably those containing a trans-cyclohexane nucleus or an aromatic nucleus containing from one to two hexacarbocyclic rings of which at least one has the usual benzenoid unsaturation. Of course, either fused or attached rings can be present. All of the compounds named come within the scope of this preferred group.

As indicated above, the reactions involved in producing the elastomeric polymers of our invention may be esterification of acids or alcoholysis of esters. Alcoholysis, as is well known, designates the reaction wherein an ester of an alcohol (A), on treatment with alcohol (B), is converted to an ester of alcohol (B) and the free alcohol (A) in accordance with the following reaction:

$$\underset{(B)}{R-\overset{O}{\underset{\|}{C}}-O-R_1 + R_2OH} \longrightarrow \underset{(A)}{R-\overset{O}{\underset{\|}{C}}-O-R_2 + R_1OH}$$

This reaction is catalyzed by numerous compounds which are termed alcoholysis catalysts or ester interchange catalysts. The catalysts which are preferred for the purposes of this invention are derivatives of titanium. A catalyst giving outstanding results is the complex of magnesium and titanium alkoxides, the structural formula of which is $$Mg[HTi(OR)_6]_2$$

where R represents methyl, ethyl, propyl, isopropyl, n-butyl, isobutyl, sec-butyl, etc.

Occasionally a condition termed biphasing is encountered during the preparation of these elastomeric polyesters. The polymer, in the molten state, is opaque due to the formation of a second polyester phase. Two different polyester compositions exist together, one rich in poly(tetramethylene glycol), the other poor in this ether-glycol. Such polyesters are difficult to spin since at a spinning temperature which produces a melt of satisfactory viscosity for forming filaments, the melt contains some higher melting solids which block the spinnerette. Higher temperatures reduce the melt viscosity below a useful value.

To avoid biphasing, it is frequently desirable to use a small amount of a second dicarboxylic acid as a modifier. This serves to increase the mutual solubility of the two polyester phases. The dicarboxylic acids most useful for this are the polymethylene dicarboxylic acids such as adipic, succinic, azelaic, suberic, pimelic, sebacic, etc., the branched aliphatic dicarboxylic acids such as 2-methyladipic, 2-ethylsuberic, 2,2,3,3-tetramethylsuccinic, etc. and the cycloaliphatic dicarboxylic acids such as the cyclohexanedicarboxylic acids, the cyclopentane-dicarboxylic acids, etc.

Another group of compounds useful for the purpose of preventing biphasing is the hydroxy carboxylic acids. A few examples of these are hydroxybutyric acid, hydroxycaproic acid, hydroxypivalic acid, 4-hydroxymethylcyclohexanecarboxylic acid, etc.

It is also advantageous for the purposes of this invention to utilize the process for the preparation of the elastomeric polyesters which is described in our copending application U.S. Serial No. 151,557, filed November 10, 1961. In this process small quantities of certain aromatic secondary or tertiary amine agents are used to obtain polymers of high inherent viscosity. These amines which we have found especially valuable in our invention may be represented by the following structural formula:

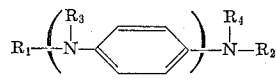

wherein $n$ is zero or one, at least one of $R_1$ and $R_2$ is selected from the group consisting of phenyl, alkyl substituted phenyl, 1-naphthyl and 2-naphthyl and no more than one of $R_1$ and $R_2$ is a substituent selected from the group consisting of alkyl groups of 1–20 carbon atoms and aryl groups of 6–20 carbon atoms and wherein $R_3$ and $R_4$ is a substituent selected from the group consisting of hydrogen, alkyl groups of 1–20 carbon atoms and aryl groups of 6–20 carbon atoms.

The amine agents employed in accordance with our invention may be used in a concentration of 0.01 to 5% by weight, based on the final polymer composition. In general the preferred range is 0.1 to 2% by weight. As indicated above, the amine is conveniently added to the reaction vessel along with the other reagents that are used to prepare the polymer. Although the usual procedure would call for the employment of only one of these amine agents, a plurality of such amines may be employed. In general the total amine content would be within the above-indicated concentration range, that is, from 0.01 to 5% by weight of the final polymer.

In another embodiment of our invention, the process described in our copending application U.S. Serial No. 186,196 (mentioned above), filed April 9, 1962 may be used. In this process, small amounts of sulfur-containing acids, such as thiodipropionic acid or derivatives of this acid are used to obtain polymers of high inherent viscosity. The derivatives of thiodipropionic acid which we have found particularly valuable for the purposes of our invention may be represented by the following formula:

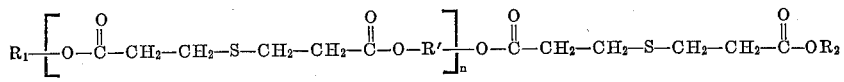

wherein $n$ is an integer from 0 to 20, $R_1$ and $R_2$ may be the same or different and are selected from the group of branched and unbranched alkyl groups of 4 to 20 carbon atoms, and $R'$ is an organic radical containing 2 to 20 carbon atoms formulated by dehydroxylating a bifunctional glycol.

In the following examples and description, we have set forth several of the preferred embodiments of our invention but they are included merely for purposes of illustration and not as a limitation.

DEFINITIONS

In certain of the examples and tables given herein we have referred to certain physical properties of the compositions and filaments, fibers and yarns produced therefrom. As an aid to a more lucid and accurate disclosure of our invention the following definitions are given:

*Elastomeric polymer.*—A polymer is considered to be elastomeric if it is capable of sustaining an elongation of 200% or more and returns rapidly to essentially its original dimension.

*Inherent viscosity (I.V.).*—This property, represented by $\{\eta\}$, which is used as a measure of the degree of polymerization of a polymeric compound, is calculated from the equation:

$$\{\eta\} = \frac{\ln \eta_r}{C}$$

wherein $\eta_r$ is the ratio of the viscosity of a dilute (approximately .25% by weight) solution of the polymer in a solvent composed of 60% by weight of phenol and 40% by weight of tetrachloroethane to the viscosity of the solvent itself, and C is the concentration of the polymer in grams per 100 cubic centimeters of the solution.

*Tenacity or tensile strength.*—This is a measure of the strength of the fiber, filament or yarn under study. It is expressed in grams per denier (g./d.) and is calculated by dividing the initial denier of the fiber under study into the tension (in grams) required to break the yarn. The values of tenacity reported in this invention were in each instance determined on a 2-inch specimen in an Instron Tester manufactured by the Instron Engineering Corporation of Canton, Mass., at a rate of extension of the specimen of 1000% per minute.

*Elongation.*—This is a measure of the extent to which a fiber, filament or yarn is stretched when it breaks. It is expressed as a percentage and is calculated by dividing the original length of the sample into the increase in length and multiplying by 100. It is measured on the Instron Tester under the same conditions as the tenacity of the fiber is measured. In the present disclosure such values are referred to as "machine elongations."

*Elastic recovery.*—This property is a measure of the ability of a fiber, yarn or filament to return to its original length after elongation. For the purposes of this invention, the elastic recovery of a sample is determined by drawing the sample to an elongation of 200% and then allowing it to return to a relaxed state (but not "snap" back). The amount of elongation which is recovered divided by the original elongation and the result multiplied by 100 gives the percent elastic recovery.

*Modulus of elasticity.*—As used herein modulus of elasticity may be defined as the tension in grams per initial denier per percentage elongation necessary to stretch the sample to the stated percentage elongation. When measuring the modulus of films the tension may be expressed in pounds per square inch.

*Crystalline melting point.*—This is defined as the temperature at which a sample of the polymer under test will flow under slight pressure on a Fisher-Johns melting point apparatus manufactured by Fisher Scientific Company, 711 Forbes Avenue, Pittsburgh, Pa.

*Thermal stability test.*—Frequent reference is made herein to the thermal and oxidative stability of the elastomeric polymers of our invention. Data on stability was determined largely on fibers extruded from the elastomeric polymer. This is the most severe type of test since the surface area of a unit weight of polymer is very high in a fiber and hence the surface exposed to oxidation is large.

Samples of the yarn were cut into 2-inch lengths (standard length for the Instron Tester) and tied into bundles of five. These bundles were placed on watch glasses and the watch glasses placed in an oven set at 125° C. Periodically a bundle of five lengths was withdrawn and the tenacity and elongation determined on the Instron Tester as described hereinabove. The results of five such determinations were averaged and the results expressed as percentage of the original value.

*Gas yellowing test.*—The degree of gas yellowing of fiber or polymer samples was determined by Standard Test Method 23–1957 "Colorfastness to Atmospheric Oxides of Nitrogen" as described in the 1960 Technical Manual of the American Association of Textile Chemists and Colorists. It should be noted that the results of this test are graded by numbers from 1 to 5. The worst result receives a grading of 1; the best a grading of 5. The grade 5 indicates that the yarn sample has gone through three or more cycles in the gas yellowing test without appreciable yellowing. A cycle is considered equivalent to six months of normal wear.

The highly elastic, highly polymeric polymers of our invention show an improved resistance to degradation by heat and air when as little as 0.01% by weight of the polymer of the 2,4,6-trialkylated phenols previously described is present in the polymer composition. As much as 5% by weight of the polymer of the phenolic compounds described above may be present in the elastomeric polyesters. The preferred amount is 0.1% to 2.0% by weight of the final polymer.

The phenolic compound may be introduced into the polyester composition by several methods which will be obvious to those skilled in the art. Of course, the simplest method is to mix the phenolic compound into the reagents from which the elastic polymer is made. However, some uncontrollable variations in composition can occur because some of the stabilizer may be lost or otherwise rendered inactive during the preparation of the polymer.

In another method, the phenolic compound is added to the comminuted elastomeric polymer immediately before spinning or extruding. The addition of the phenolic compound is most simply accomplished by dusting the dry powder or spraying a solution of the compound onto the comminuted material. A preferred method is to add the phenolic compound to the elastomeric polymer at the completion of polymerization. This is conveniently accomplished by arranging a pumping system to inject the phenolic compound or phenolic compounds in the liquid state into the molten polymer as it is extruded at the end of its polymerization.

The addition of the phenolic compound to the elastomer may also be accomplished by mixing a "master batch" of phenolic compound into the regular polymer. This master batch is prepared by milling a high concentration of the phenolic compound into a low melting elastomeric composition. The master batch is then chopped, blended in the proper proportions with the base polymer, and the blend spun, molded or extruded in the desired form.

In addition, other materials can be added to the elastomeric polyester which serve to improve the properties or appearance of the final article of manufacture. For example, pigments or other coloring materials, delustering agents and anti-sticking agents can be added to the polymer during synthesis or prior to shaping into final form. Compounds which inhibit degradation of the polymer by ultra-violet light, such as derivatives of salicyclic acid or benzophenone, may be incorporated into the polymer by the above methods. Other stabilizers which preserve the polymer from thermal or oxidative degradation may also be added by the means described hereinabove. Mixtures of all these various additives can be blended in simultaneously through the use of the master batch technique described above or by any of the other methods described.

These phenolic compounds which we have described above, coupled with the highly elastic highly polymeric polyesters also described above, provide elastomeric compositions which show excellent resistance to degradation by heat and air. Particularly stable compositions are produced if, in addition to the phenolic compounds, there is also introduced into the elastomeric composition at least one of a group of compounds prepared from a thiodipropionic acid. This group of compounds includes the esters and polyesters prepared from thiodipropionic acid itself or from a dialkyl, or tetraalkyl substituted thiodipropionic acid. These compounds are represented by the structural formula:

methyl-3,3'-thiodipropionic acid and 3,3'-dimethyl-3,3'-thiodipropionic acid having average molecular weights in the range 400 to 4000 are also valuable synergists. The preferred average molecular weight for such polyesters lies in the range 500 to 1500. These polyesters are prepared from a thiodipropionic acid, a diol and a monohydric alcohol which acts as a chain terminator by methods well-known in the art. A polyester which we have found of especial value is that prepared from thiodipropionic acid, ethylene glycol and 2-ethylhexanol. Such polyesters are more fully described and many examples are given in Tholstrup et al. application Serial No. 77,862 filed December 23, 1960, and continuations-in-part thereof Serial Nos. 309,309 and 309,339 filed on September 16, 1963.

These sulfur containing esters and polyesters exert a synergistic action upon the 2,4,6-trialkylated phenols described above. Specifically, the elastomeric highly polymeric polyesters which contain both the phenolic compounds described above and the thiodipropionic acid derivatives described show an outstanding ability to resist degradation by the action of heat and air. This is surprising since thiodipropionic acid derivatives show little ability to confer this resistance when used alone. The remarkable stability is conferred upon the polyesters by the synergistic effect of the combination of phenolic compound and thiodipropionic acid derivative.

The thiodipropionic acid derivative may be used in amounts in the range of 0.05% to 5% by weight of the polymer. However, the preferred range is 0.1 to 2% by weight of the polymer.

Although the usual procedure would call for the employment of only one of the phenolic compounds described above and only one of the derivatives of thiodipropionic acid, if such a derivative is used, a plurality of phenolic compounds or of thiodipropionic acid derivatives can be employed. In general the total phenolic compound content of the final polymer would be within the above-indicated concentration range, that is, from 0.01 to 5% by weight of the final polymer. The total content of thiodipropionic acid derivatives if these were also used, would be within the above-indicated limits of 0.05 to 5% by weight of the final polymer.

Figure 1:
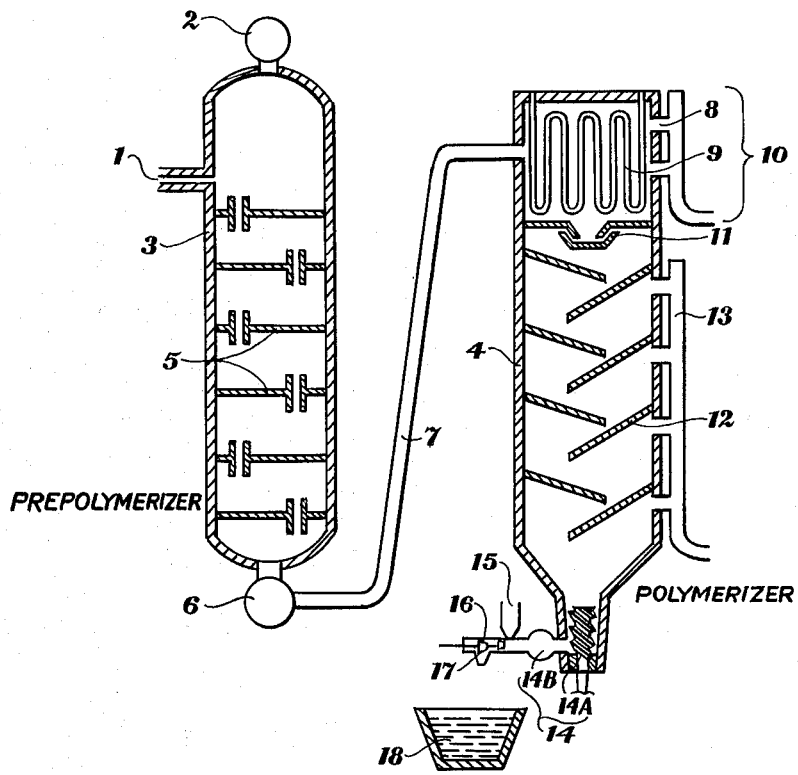
FIG. 1 is a simplified illustration in the nature of a flow sheet showing in vertical elevational section and schematically one form of apparatus in which the stabilized elastomeric, highly polymeric compositions of our invention may be produced.

The following specific examples will serve further to illustrate our invention.

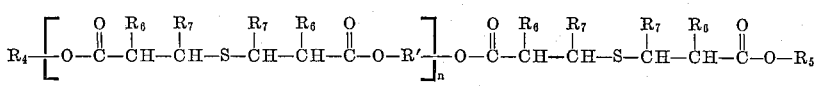

wherein $n$ is an integer from 0 to 20, $R_4$ and $R_5$ may be the same or different and are selected from the group consisting of branched and unbranched alkyl groups containing 4 to 20 carbon atoms, $R'$ is an organic radical containing 2 to 20 carbon atoms formulated by dehydroxylating a bifunctional glycol, and $R_6$ and $R_7$ may be the same or different and are selected from the group consisting of hydrogen and branched and unbranched alkyl groups containing 1 to 10 carbon atoms. Among the specific compounds of interest for the purposes of this invention, the simple esters dilauryl 3,3'-thiodipropionate, dilauryl 2,2'-dimethyl-3,3'-thiodipropionate and bis 2-ethylhexyl 3,3'-dimethyl-3,3'-thiodipropionate are particularly valuable. Polyesters of 3,3'-thiodipropionic acid, 2,2'-di-

Example 1

A 250 ml. flask equipped with stirrer, nitrogen inlet and distillation head was charged with 9.5 g. (0.04875 mole) of dimethyl terephthalate, 0.4 ml. (0.00125 mole) of dibutyl sebacate, 16.5 g. (0.08 mole) 1,4-cyclohexanedimethanol containing 30% methanol, 22.5 g. (.008 mole) of poly(tetramethylene glycol) of molecular weight 2800, 0.2 g. of N-ethyl-4,4'-dioctyldiphenylamine (½% by weight of the final polymer) and 0.3 ml. of a 21% solution of $Mg[HTi(OC_4H_9)_6]_2$ in n-butanol.

The mixture was stirred and heated under nitrogen to a temperature of 200° C. During the first, or alcoholysis, stage of the reaction methanol and butanol are evolved and may be collected, if desired, to measure the course of the reaction. After sixty minutes the reaction temperature was increased over a forty minute period to 280° C. A vacuum was then rapidly applied and within five minutes the pressure was reduced to less than 0.15 mm. of mercury. The residual polymer was stirred at this temperature and pressure for sixty minutes during which time the viscosity of the melt increased rapidly until the polymer was wrapping about the stirrer in a ball. The product from this second, or melt phase, stage of the polymer preparation was cooled, removed from the flask and found to have an inherent viscosity of 1.51. The final polymer contained 64.5% by weight of poly(tetramethylene glycol) and had a crystalline melting point of 245–250° C.

*Example 2*

The polymer prepared in accordance with Example 1 was comminuted by chopping into cubic particles approximately ⅛″ to a side. For each 100 g. of comminuted polymer, 1 g. of di-lauryl thiodipropionate and 0.5 g. of 2,6-di-n-dodecyl-p-cresol were added. The mixture was tumbled to ensure complete mixing of the additives and the mixture used directly for the production of elastomeric filaments by a melt spinning process. In an alternative procedure, the dilauryl thiodipropionate and 2,6-di-n-dodecyl-p-cresol were dissolved in benzene so as to form a solution containing approximately 10% solids. The solution was added slowly to the well stirred comminuted polyester and the final mixture was dried for four hours at 25° C. and 0.5 mm. of mercury pressure. The comminuted polymer, the particles of which had now been coated with a layer of the mixed additive (dilauryl thiodipropionate and 2,6-di-n-dodecyl-p-cresol) was melt spun into elastomeric filaments.

*Example 3.—Preparation of a "Master Batch"*

The polymer prepared from 1 mole of dimethyl terephthalate, 0.7 mole of 1,4-cyclohexanedimethanol and 0.3 mole of poly(tetramethylene glycol) of molecular weight 2800 is used as the dispersing medium for the master batch. Two hundred g. of this polymer was placed on the rolls of a small rubber rolling mill, the rolls being maintained at 150° C. When the polymer had properly banded on the rolls, 12.5 g. of 2,6-di-n-dodecyl-p-cresol, 12.5 g. of a polyester of thiodipropionic acid, ethylene glycol and 2-ethylhexanol having a molecular weight 1500 (designated poly TDP–1500) and 25 g. of rutile titanium dioxide (delustering agent) were added portionwise. The band was stripped from the rolls, broken and replaced on the rolls until proper mixing was ensured. It was then removed and broken into small chips approximately ⅛ to ½ inch square.

This material was blended with 2250 g. of the polymer prepared by the procedure of Example 1. The final mixture was melt spun into fibers which contained 1% by weight titanium dioxide, 0.5% by weight of 2,6-di-n-dodecyl-p-cresol and 0.5% by weight of poly TDP–1500.

*Example 4*

The procedure of Example 1 was repeated except that the N-ethyl-4,4′-dioctyldiphenylamine was replaced with 0.4 g. (1% by weight of the final polymer) of dilauryl thiodipropionate and 0.2 g. (0.5% by weight of the final polymer) of 2,6-di(1-methylheptadecyl)-p-cresol. The final polymer of melting point 240–250° C. and inherent viscosity 1.61 was comminuted and used directly for the production of elastomeric fibers by melt spinning.

*Example 5*

For the commercial production of elastomeric polymers, it is preferable that the method of manufacture be based on a continuous process. Such a process is described in the following example.

Figure 2:
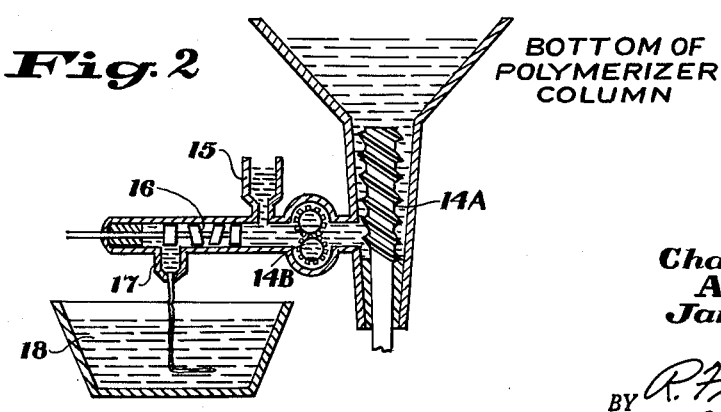
FIG. 2 is a fragmentary vertical elevational section of the output end of the polymerizer shown in FIG. 1 and of the mechanism for mixing the stabilizer composition with the finished polymer produced therein.

The FIGURE 1 of the drawing is a simplified illustration in the nature of a flow sheet showing schematically one form of apparatus in which our process may be carried out. Each batch of reagents consisted of 3880 g. (20 moles) of dimethyl terephthalate, 9323 g. (3.33 moles) of poly(tetramethylene glycol) of molecular weight of the final polymer) of dilauryl thiodipropionate. dimethanol (70% trans), 114 g. of a 21% solution of $Mg[HTi(OC_4H_9)_6]_2$ in n-butanol, and 144 g. (1% by weight of the final polymer) of dilauryl thiodipropionate. The mixture is melted by heating to 140° C. stirred and fed at a rate of 17 lbs. per hour into the prepolymerizer through the inlet 1. The prepolymerizer column was heated to 220° C. (operating range of the column is 180–280° C.) by the hot oil system 3 and the pressure in the column generated by the evolved methanol was regulated by regulator 2 at 10 p.s.i. (operating range of pressures is 0 to 150 p.s.i.). The term p.s.i. is used herein to indicate pounds per square inch gauge. The mixture of reagents covered the plates and flowed through the overflow pipes 5 onto the next lower plate. At the bottom of the prepolymerizer, the reaction product is delivered by pump 6 through heated tube 7 to the polymerizer in which the final polymer is formed. This reactor was heated to 278° C. by a second hot oil system 4 (operating range 260 to 310° C.) and maintained under vacuum by two vacuum systems and manifolds 8 and 13. The reactor was divided into two sections separated by a liquid seal 11 in which molten polymer served as the liquid. The upper section above the liquid seal was maintained at a pressure of 1–2 mm. of mercury (operating range 0.5 to 50 mm. of mercury) and the lower section was maintained at a pressure of 0.2 mm. of mercury (maximum operating pressure, 0.5 mm. of mercury). The low molecular weight material delivered to the polymerizer was distributed over the vertical tube bundle 9 so as to expose the maximum surface area to the vacuum, and then passed through the liquid seal 11 into the lower section. In this section, the polymer flowed over a series of sloping heated baffle plates 12 as it descended the column. During the descent, the polymer increased rapidly in viscosity. At the bottom of the column pump 14 served to remove the polymer from the column. The polymer was pumped from the bottom of the polymerizer into a quenching bath of cold water. Immediately before injecting it into the cold water, a quantity of additive was metered in and mixed with this molten material by a second pump 15. Further details of this metering operation are shown in FIGURE 2. This more detailed schematic diagram shows that the pump 14 consisted of two components 14A and 14B. The first component, 14A, is a motor driven screw which delivered the molten polymer in the bottom of the polymerizer column into the second component, a gear pump 14B. This latter pump served to regulate the rate of extrusion of the molten polymer. After passing pump 14B, the polymer encountered a stream of additive metered in by a syringe pump 15. The mixture of polymer and additive was rendered homogeneous by a motor driven multiple paddle stirrer 16 and finally the polymer stream was extruded in the form of a rod through orifice 17 into the quenching bath 18 from which it may be continuously removed in solid form and chopped into pellets. The rate of introduction of the additive was regulated so that the extruded molten polymer contained 0.3% by weight of the polymer of 2,6-di-n-dodecyl-p-cresol and 1% by weight of the polymer of dilauryl thiodipropionate in excess of that introduced with the reagents since much of this last material was lost or otherwise rendered inactive during the vacuum polymerization.

The final polymer which had an inherent viscosity of 1.67 and a melting point of 245–250° C. showed remarkably little tendency to degrade on heating in the presence of air. For example, samples of the polymer chopped into rough cubes ⅛–¼ of an inch to a side were heated in air at 100° C. After 338 hours of treatment, the inherent viscosity had decreased to only 1.59, a decrease of 4.7%. A similar sample was prepared by the above method except that the phenolic compound was omitted. On heating only 4 hours at 100° C. in air, the initial inherent viscosity of 1.51 fell to 1.14. This represents a decrease in inherent viscosity of 24.5% and furthermore this decrease occurred in only 12% of the time interval used in the first test.

In the following tables, the change of the physical properties of elastomeric fibers on heating in air is summarized. Various phenolic compounds are used to illustrate the effect of these compounds on the thermal and oxidative stability of the fiber. It should be kept in mind that the properties of the base elastomeric polymers are constant only within the confines of each table. That is, the base polymer used to prepare the compositions of Table 1 is different from that used to prepare the compositions of Table 2, etc. Since the thermal and oxidative stability of the base polymer varies in a manner dependent on its history prior to its use, conclusions concerning the relative stability of various compositions should be made only between examples in a single table.

Santonox R—Commercially available from Monsanto Chemical Company

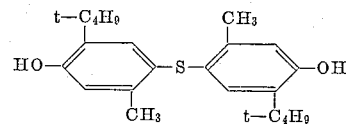

Stabilizer 2246—Stabilizer of chemical structure

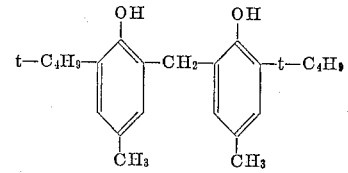

From the results summarized in Table 1, it can be seen that 2,6-di-tertiary butyl-p-cresol confers thermal and oxidative stability to elastomeric fibers when it is used alone or in combination with dilauryl thiodipropionate. Esters and polyesters of thiodipropionic acid used alone confer stability to the fibers but, as the data of Table 2 shows,

TABLE 1.—OVEN STABILITY OF FIBERS AT 125° C.

| Example | Additive | Wt. percent additive | Wt. percent TiO$_2$ | Gas yellowing test | Initial properties | | Percent of original fiber properties after 40 hours | |
|---|---|---|---|---|---|---|---|---|
| | | | | | Tenacity, g./d. | Elongation, percent | Tenacity | Elongation |
| 6 | None | | | 5 | 0.57 | 440 | (¹) | (¹) |
| 7 | do | | 2 | 5 | 0.57 | 427 | (¹) | (¹) |
| 8 | DLTDP | 2 | 2 | 5 | 0.57 | 451 | 81 | 81 |
| 9 | Poly TDP-491 | 2 | 2 | 5 | 0.51 | 434 | 97 | 101 |
| 10 | Poly TDP-1100 | 2 | 2 | 5 | 0.50 | 495 | 82 | 83 |
| 11 | BHT | 2 | 2 | 5 | 0.51 | 388 | 79 | 84 |
| 12 | {BHT, DLTDP} | 2, 2 | 2 | 5 | 0.53 | 450 | 82 | 86 |
| 13 | {Santowhite powder, Poly TDP-1100} | 1, 1 | 2 | 2 | 0.54 | 492 | 90 | 89 |
| 14 | {Santonox R, DLTDP} | 1, 1 | 2 | 2 | 0.59 | 435 | 78 | 79 |
| 15 | {DLTDP, 4,4'-dioctyldiphenylamine} | 1, 1 | 2 | 1 | 0.52 | 462 | 90 | 95 |
| 16 | {DLTDP, Stabilizer 2246} | 1, 0.5 | 2 | 1 | 0.53 | 480 | 92 | 93 |

¹ Too weak to test at 15 hours.

Explanation of abbreviations for Table 1:

DLTDP—Dilauryl ester of thiodipropionic acid
Poly TDP—Polyester of thiodipropionic acid, ethylene glycol and 2-ethylhexanol; the molecular weight is indicated by the number following the symbol.
BHT—2,6-di-tert. butyl-p-cresol
Santowhite Powder—Commercially available from Monsanto Chemical Company

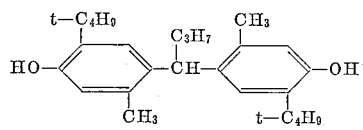

the stability conferred to the elastomeric polyesters by these derivatives is slight compared to that conferred by the phenolic compounds. Commercially available compounds such as Santowhite Powder, Santonox R, stabilizer 2246 and 4,4'-dioctyldiphenylamine also confer stability to the elastomeric fiber but fail to provide a fiber composition which does not discolor on exposure to air and light. This property of turning yellow in air and light is measured by the Gas Yellowing Test described hereinabove.

It is instructive at this point to compare the action of stabilizer 2246 (Example 16) and BHT (Examples 11, 12). Both compounds are 2,4,6-trialkylated phenols and both compounds provide elastomeric compositions which are thermally and oxidatively stable. However, the fiber containing stabilizer 2246 discolors badly during the Gas Yellowing Test while the fiber containing BHT does not. This difference in behavior is quite unexpected and novel.

Other 2,4,6-trialkylated phenols have been examined thoroughly and the properties of elastomeric fibers containing such compounds are summarized in Table 2.

TABLE 2.—OVEN STABILITY OF FIBERS AT 125° C.

| Example | Additive | Wt. percent additive | Wt. percent TiO₂ | Gas yellowing test | Initial tenacity, g./d. | Properties elongation, percent | Percentage of original properties (tenacity/elongation) after hours indicated | | | | | |
|---|---|---|---|---|---|---|---|---|---|---|---|---|
| | | | | | | | 40 hrs. | 63 hrs. | 111 hrs. | 207 hrs. | 255 hrs. | Hrs. as noted |
| 17 | DLTDP | 2 | 2 | 5 | 0.45 | 641 | 58/62 | 16/8 | (¹) | | | |
| 18 | DLTDP / DDPC | 1.0 / 0.1 | 2 | 4-5 | 0.51 | 698 | 85/90 | 84/102 | 75/86 | 55/60 | 34/33 | 32/23 (303 hrs.). |
| 19 | DLTDP / DDPC | 1.0 / 0.2 | 2 | 5 | 0.42 | 592 | 99/93 | 86/81 | | 77/90 | 78/88 | 70/81 (351 hrs.). |
| 20 | DLTDP / DDPC | 0.1 / 0.3 | 2 | 5 | 0.40 | 761 | 93/93 | 72/94 | | 77/91 | 20/15 | |
| 21 | Poly TDP-680 / DDPC | 1.0 / 0.2 | 2 | 5 | 0.41 | 640 | 96/114 | 92/100 | | 85/98 | 80/95 | 69/85 (472 hrs.). |
| 22 | Poly TDP-680 / DDPC | 0.5 / 0.2 | 2 | 5 | 0.42 | 638 | 103/99 | 97/102 | 95/93 | 93/102 | 91/104 | 82/95 (375 hrs.). |
| 23 | Poly TDP-680 / 2,4-dimethyl-6-octadecyl phenol. | 0.5 / 0.2 | 2 | 4 | 0.40 | 726 | 96/94 | 95/99 | 86/81 | 90/90 | 43/43 | 15/10 (303 hrs.). |
| 24 | DLTDP / 2,6-(1-methylheptadecyl)-p-cresol. | 0.5 / 0.3 | 2 | 5 | 0.39 | 826 | 88/96 | 93/96 | 90/98 | 78/85 | 74/78 | 70/72 (303 hrs.). |
| 25 | DLTDP / 2,6-di-n-octadecyl-p-cresol. | 0.5 / 0.5 | 2 | 5 | 0.40 | 707 | 93/94 | 95/92 | 90/93 | 95/90 | 88/85 | 75/82 (375 hrs.). |
| 26 | DDPC | 0.5 | 2 | 5 | 0.40 | 807 | 88/81 | 88/111 | 66/79 | 32/37 (159 hrs.) | | |
| 27 | DLTDP / 3-dodecyl-2-hydroxy-5-methyl laurophenone. | 1.0 / 0.1 | 2 | | 0.43 | 678 | 13/11 | (¹) | | | | |
| 28 | DLTDP / 2-octadecyl-p-cresol | 0.5 / 0.3 | 2 | 4 | 0.40 | 736 | 87/83 | 84/83 | 80/85 | 57/65 | 6/4 | |
| 29 | DLTDP / 2,6-di(methylheptyl)-p-cresol. | 1.0 / 0.5 | 2 | 5 | 0.49 | 747 | 47/25 | 13/4 | (¹) | | | |

¹ Disintegrated.

Explanaton of abreviations:

DDPC—2,6-didodecyl-para-cresol.
DLTLP and Poly TDP—as in Table 1.

Table 2 consists of a more extensive tabulation of the thermal and oxidative stability of fibers fabricated from the novel elastomeric compositions described hereinabove. Example 17 shows that the base polymer, containing as much as 2% dilauryl thiodipropionate, has an oven life of only somewhat over 40 hours. The term oven life is herein used to indicate the period of time in which the fibers retain more than 50% of their original tenacity and elongation. Examples 18 through 20 show the unexpectedly high oven life of fibers which contain small amounts of 2,6-di-n-dodecyl-p-cresol. Quantities of this phenol as small at 0.1% by weight result in fibers having an oven life in excess of 200 hours.

Polyesters of thiodipropionic acid may be used in place of dilauryl thiodipropionate with good effect as may be seen from Examples 21 and 22. The composition of Example 21 has a particularly high oven life, in excess of 472 hours. This represents at least a ten fold improvement over the composition of Example 17. Examples 23, 24 and 25 demonstrate that 2,4,6-trialkylated phenols other than 2,6-di-n-dodecyl-p-cresol may be used to advantage. It should be noted that all these compositions have very high ratings on the Gas Yellowing Test, and thus show very little or no tendency to change color on exposure to light, air and atmospheric impurities. Example 26 demonstrates that the presence of esters or polyesters of thiodipropionic acid is not essential to ensure a good thermal and oxidative stability in the fiber. The phenolic compound, 2,6-di-n-dodecyl-p-cresol provides compositions with a high degree of stability.

Example 27 demonstrates that the presence of a carbonyl group in the alkyl substituent of the phenol destroys the ability of the compound to impart thermal and oxidative stability to the elastomeric fibers. Examples 28 and 29 indicate that the number and size of the substituent groups has a marked effect on the ability of the compounds to impart stability to fibers.

This final item, the effect of the size of the alkyl side groups has been studied more closely and these results are tabulated in Table 3. In obtaining these results, a particularly stringent set of conditions was employed. The base elastomeric polyester from which the compositions of Table 3 were prepared, was one which contained no additive to improve its thermal and oxidative stability and, in addition, had been stored for an extensive period without protection. As a consequence, it was found to have undergone partial decomposition. Such a polymer will emphasize small differences in the ability of the compounds under test to impart thermal and oxidative stability to the elastomeric compositions.

TABLE 3.—OVEN STABILITY OF FIBERS AT 125° C.

| Example | Additive | Wt. percent additive | Wt. percent TiO² | Total carbon atoms in side chains | Total carbon atoms in longest unbranched sequence of side chain | Percentage of original properties (tenacity/elongation) after hours indicated | | | | |
|---|---|---|---|---|---|---|---|---|---|---|
| | | | | | | 15 hrs. | 39 hrs. | 63 hrs. | 111 hrs. | 159 hrs. |
| 30 | 2,6-di-n-dodecyl-p-cresol / TDP ¹ | 0.2 / 0.5 | 2 | 25 | 25 | 97/98 | 98/107 | 94/101 | 58/59 | 3/25 |
| 31 | 2-n-dodecyl-6-tetramethyloctyl-p-cresol / TDP | 0.2 / 0.5 | 2 | 25 | 21 | 99/96 | 99/104 | 75/82 | 43/49 | 1/1 |
| 32 | 2,6-di-(tetramethyl-octyl)-p-cresol / TDP | 0.2 / 0.5 | 2 | 25 | 17 | 98/96 | 5/8 | (²) | | |
| 33 | 2-tert-butyl-6-n-dodecyl-p-cresol / TDP | 0.2 / 0.5 | 2 | 17 | 15 | 97/103 | 93/98 | 3/3 | (²) | |
| 34 | 2-methyl-6-octadecyl-p-cresol / TDP | 0.2 / 0.5 | 2 | 20 | 20 | 97/96 | 92/100 | 65/72 | 20/27 | (²) |
| 35 | 2,6-di-n-octyl-p-cresol / TDP | 0.2 / 0.5 | 2 | 17 | 17 | 93/102 | 95/100 | 4/4 | (²) | |
| 36 | No additive | | 2 | | | (²) | | | | |

¹ TDP—polyester of thiodipropionic acid, ethylene glycol and 2-ethylhexanol.    ² Disintegrated.

Two terms are used in Table 3 which are here described in more detail, (1) *Total carbon atoms in side chains* is the sum of the carbon atoms in the three alkyl groups which are attached to phenol in the 2, 4 and 6 positions.

(2) *Total carbon atoms in longest unbranched sequence of side chains.*—In cases where the substituent alkyl groups are branched, the longest unbranched chain of carbon atoms is selected in each substituent group and the number of carbon atoms in the three sequences so chosen is totaled.

An examination of Examples 30, 31 and 32 will show that these three compositions are similar in that each has a total of 25 carbon atoms in the side chains. However, the oven stability of the composition of Example 32 is much less than that of Examples 30 and 31, and, in addition, the phenolic compound present in the composition of Example 32 has the least number of carbon atoms in the longest unbranched sequences present in the side chains. It must be concluded, then, that the degree of branching in the alkyl groups of the phenolic compound has a marked effect on the thermal and oxidative stability of the elastomeric compositions which contain the phenolic compound. An examination of the remaining items of Table 3 will show that the sum of the carbon atoms in the longest unbranched sequence present in each alkyl substituent of the 2,4,6-trialkylated phenol is preferably equal to or larger than 20. Elastomeric compositions which contain such trialkylated phenols will possess a high degree of resistance to degradation by heat and air and, in addition, will show little or no tendency to discolor on exposure to air and light.

*Example 33*

The previous examples have illustrated our invention with polyester compositions using esters of terephthalic acid as the major dicarboxylic acid. Our invention is fully operative with other dicarboxylic acids as the major acidic constituent of the elastomeric polyester. The following example illustrates our invention using esters of 2,6-naphthalene dicarboxylic acid.

A flask was charged with 24.4 g. (0.1 mole) of dimethyl 2,6-naphthalenedicarboxylate, 56.0 g. (0.02 mole) of poly(tetramethylene glycol), molecular weight 2800, 25.9 g. of 1,4-cyclohexanedimethanol (70% trans) and 0.6 ml. of a 42% solution of $Mg[HTi(OC_4H_9)_6]_2$ in n-butanol. The flask was swept with nitrogen, and the contents stirred and heated to 200° C. Alcoholysis proceeded rapidly, and the methanol which distilled was condensed and collected. When 6 ml. had distilled (70% of theory), the temperature was raised over a one-hour period to 290° C. A vacuum was then applied and the molten mass stirred at 290° C. and 0.3 to 0.2 mm. of pressure for one hour. The final polymer which contains 67.4% by weight of the polyether-glycol was cooled under vacuum and removed from the flask. It had an inherent viscosity of 1.29 and a crystalline melting point of 190–210° C.

One hundred grams of this polymer was chopped into pellets of about ⅛″ diameter. This material was treated with 100 ml. of benzene containing 1 g. of dilauryl thiodipropionate and 0.5 g. of 2,6-di-n-dodecyl-p-cresol dissolved in it. The mixture was dried and spun into fibers. These fibers were found to retain at least 50% of their original elongation and tenacity on exposure to air at 125° C. for periods as long as 250 hours. In the absence of the phenolic compound, the fibers disintegrated after 30 hours of heating.

The elastomeric polyester filaments, fibers and yarns of this invention are characterized by a high melting point, a high degree of elongation and recovery from stretch, and a high strength. It is apparent that the fabrics constructed from these fibers will be useful in the manufacture of many articles, such as brassieres, girdles, surgical hosiery, men's braces, bathing suits, stocking tops, suspenders, garters, pajamas, panties, shorts, sweaters, jackets, ski togs, dresses, blouses, shirt collars, skirts, caps and hats, gloves, tapes and ribbons, laces, belting, shoe fabrics, slip covers, upholstery, elastic bandages, hair nets, covers for jars and dishes, ropes and balls, and many other products.

In many of these articles it is advantageous that the elastomeric fibers possess good thermal and oxidative stability. For example, articles of attire such as bathing suits, stockings, dresses, panties, girdles and the like, are subjected to heat in the presence of air during washing, drying and ironing. In such instances, the compositions of our invention are particularly advantageous since they have a high degree of resistance to degradation by heat in the presence of air. Furthermore, our novel compositions show an unexpected stability of color. That is, the fiber shows little or no tendency to discolor on exposure to air, light and atmospheric impurities. This property has particular value for the textile industry since garments fabricated from fibers of our composition retain their original color after extensive periods of storage and after lengthy exposure to sunlight and air.

While the invention has been described in terms of an elastic yarn, it will be understood that the characteristics of the subject polyesters can find uses other than in yarns. Among such uses, there may be mentioned elastic coatings for paper and the like, fabric coatings, conformable elastic films, heat-shrinkable closures for bottles and the like, safety glass interlayers, flexible tubing, coatings for wire, and many other products.

Although the invention has been described in considerable detail with particular reference to certain preferred embodiments thereof, variations and modifications can be effected within the spirit and scope of the invention as described hereinabove, and as defined in the appended claims.

We claim:

1. A highly elastic polyester stable to thermal and oxidative deterioration comprising the reaction product derived from (A) at least one compound selected from the class consisting of dibasic carboxylic acids and their esters and (B) at least one member of the group consisting of the cis- and trans- isomers of 1,4-cyclohexanedimethanol and (C) the ether-glycol having the structural formula:

wherein $n$ is an integer from 14 to 70, the polyether being present in an amount corresponding to 50–80 weight percent of the final elastic polyester, the final elastic polyester being one in which the dihydroxy moiety contains at least 50 mole percent of (B) and having a crystalline melting point greater than 150° C. and an inherent viscosity within the range of 1.0–2.5 and containing as a combination of stabilizers (I) 0.01–5.0% by weight of the polyester a 2,4,6-trialkylated phenol having the general formula:

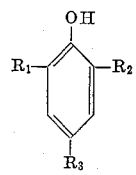

wherein each of $R_1$, $R_2$, and $R_3$ represents an alkyl group having from 1 to 20 carbon atoms and the sum of the carbon atoms in $R_1$ together with $R_2$ is at least 19, and 0.05–5% by weight of the polyester of an additional stabilizer (II) selected from the group consisting of (1) an alkyl ester of thiodipropionic acid wherein each alkyl group contains from 4 to 20 carbon atoms and (2) a polyester having an average molecular weight of 400–4,000 of thiodipropionic acid, a glycol having from 2 to 20 carbon atoms and a monohydric alcohol having from 4 to 20 carbon atoms.

2. A fiber of the polyester of claim 1.

3. A film of the polyester of claim 1.

4. The polyester of claim 1 wherein $R_3$ is methyl.

5. The polyester of claim 1 in which the stabilizer I, is 2,6-di-n-dodecyl-p-cresol and the stabilizer II is dilauryl 3,3'-thiodipropionate.

6. The polyester of claim 1 in which the stabilizer I is 2,6-di-n-octadecyl-p-cresol and the stabilizer II is dilauryl 3,3'-thiodipropionate.

7. The polyester of claim 1 in which the stabilizer I is 2,6-di-(1-methylheptadecyl)-p-cresol and the stabilizer II is dilauryl 3,3'-thiodipropionate.

8. The polyester of claim 1 in which the stabilizer I is a 2,6-dialkylated p-cresol and in which the sum of the carbon atoms in groups $R_1$ and $R_2$ is at least 19 and in which the stabilizer II is a polyester prepared from a thiodipropionic acid having an average molecular weight of 500–1500.

9. The polyester of claim 1 in which the stabilizer I is 2,6-di-n-dodecyl-p-cresol and the stabilizer II is a polyester prepared from thiodipropionic acid, ethylene glycol, 2-ethylhexanol and having an average molecular weight of 500–1500.

10. The polyester of claim 1 in which the stabilizer I is 2,6-di-n-octadecyl-p-cresol and the stabilizer II is a polyester prepared from thiodipropionic acid, ethylene glycol, 2-ethylhexanol and having an average molecular weight of 500–1500.

References Cited by the Examiner

UNITED STATES PATENTS

| | | | |
|---|---|---|---|
| 2,563,835 | 8/1951 | Gribbins | 260—45.85 |
| 2,632,751 | 3/1953 | Anderson | 260—45.95 |
| 2,664,378 | 12/1953 | Heller | 260—45.95 |
| 2,901,466 | 8/1959 | Kibler et al. | 260—75 |
| 2,984,645 | 5/1961 | Hoeschle | 260—45.95 |
| 3,033,822 | 5/1962 | Kibler et al. | 260—76 |
| 3,044,987 | 7/1962 | Schaefgen et al. | 260—75 |
| 3,069,369 | 12/1962 | Galbraith et al. | 260—45.95 |

FOREIGN PATENTS

| | | |
|---|---|---|
| 587,296 | 5/1960 | Belgium. |

LEON J. BERCOVITZ, *Primary Examiner.*